US007839609B2

(12) United States Patent
Mayer et al.

(10) Patent No.: US 7,839,609 B2
(45) Date of Patent: Nov. 23, 2010

(54) AUXILIARY LIGHTING CIRCUIT FOR A GASEOUS DISCHARGE LAMP

(75) Inventors: Thomas J. Mayer, Wisconsin Dells, WI (US); Glenn D. Garbowicz, Algonquin, IL (US)

(73) Assignee: Varon Lighting Group, LLC, Elmhurst, IL (US)

( * ) Notice: Subject to any disclaimer, the term of this patent is extended or adjusted under 35 U.S.C. 154(b) by 647 days.

(21) Appl. No.: 11/782,103

(22) Filed: Jul. 24, 2007

(65) Prior Publication Data

US 2009/0027016 A1 Jan. 29, 2009

(51) Int. Cl.
*H02H 7/00* (2006.01)

(52) U.S. Cl. ........................................................ 361/18

(58) Field of Classification Search .................... 361/18
See application file for complete search history.

(56) References Cited

U.S. PATENT DOCUMENTS

| | | | | |
|---|---|---|---|---|
| 3,927,348 | A * | 12/1975 | Zawadski | 315/88 |
| 3,976,910 | A * | 8/1976 | Owens et al. | 315/92 |
| 4,005,331 | A * | 1/1977 | Horowitz | 315/92 |
| 4,042,856 | A * | 8/1977 | Steigerwald | 315/246 |
| 4,099,095 | A * | 7/1978 | Turner | 315/92 |
| 4,236,100 | A * | 11/1980 | Nuver | 315/92 |
| 4,996,463 | A * | 2/1991 | Horowitz | 315/250 |
| 5,300,863 | A * | 4/1994 | Mayer | 315/276 |
| 6,222,322 | B1 * | 4/2001 | Stack | 315/119 |
| 7,397,194 | B2 * | 7/2008 | Garbowicz et al. | 315/86 |
| 2005/0269969 | A1 * | 12/2005 | Van Casteren | 315/291 |
| 2007/0205729 | A1 * | 9/2007 | Garbowicz et al. | 315/299 |

* cited by examiner

*Primary Examiner*—Ronald W Leja
(74) *Attorney, Agent, or Firm*—Levenfeld Pearlstein, LLC

(57) ABSTRACT

A non-arcing electrical switch for use with an auxiliary light source for a gaseous discharge lamp includes a current sensing component, a timer power component, an off-delay timer, a voltage control component, and a phase control component. When the light output from the gaseous discharge lamp is interrupted, or during the initial warm up of the gaseous discharge lamp, the non-arcing electrical switch activates an auxiliary lamp to supply temporary illumination. The electrical switch has improved reset reliability and repeatability while decreasing the reset period required during momentary interruptions of the gaseous discharge lamp. Furthermore, the electrical switch requires no negative or minus power supply in order to initiate reset and operates at voltages of less than two volts.

46 Claims, 4 Drawing Sheets

AUXILIARY LIGHTING CIRCUIT FOR A GASEOUS DISCHARGE LAMP

BACKGROUND OF THE INVENTION

The present invention is directed to a non-arcing electrical switch. More particularly, the present invention pertains to an auxiliary lighting circuit for use with a gaseous discharge lamp.

An auxiliary lighting circuit generally refers to a circuit which activates a lamp, usually incandescent, when the primary lighting means is interrupted or fails. Auxiliary lighting circuits are widely used on gaseous discharge lamps to provide light in the event the gaseous discharge lamp fails or is interrupted.

Due to their high efficiency and long life span, gaseous discharge lamps are commonly used in retail displays, gymnasiums, factories, hallways, outdoor sports lighting, streets, parking areas, and bridge underpasses. Commonly known examples of gaseous discharge lamps include fluorescent and High Intensity Discharge (HID) lamps, such as metal halide, sodium, and mercury vapor lamps.

Light can be produced in these discharge lamps by establishing an arc through a gas, a process known as electric discharge, or gaseous discharge. However, it can take several seconds for the arc to be established, and several minutes until full light output is reached. If power to the gaseous discharge lamp is interrupted, the discharge lamp must be allowed to cool for a time, usually several minutes, before the arc can be reestablished and normal operation resumed.

To compensate for the lack of light during the period of time when the discharge lamp is not illuminated or is in a low luminescence condition, a standby, or auxiliary, incandescent lamp is typically connected to the discharge lamp to provide auxiliary lighting. The auxiliary lighting circuitry senses the state of the discharge lamp and energizes the secondary/auxiliary lamp. When power is applied, the auxiliary lamp illuminates while the discharge lamp has time to cool then restrike/relight, at which time the auxiliary lamp is extinguished. A time delay feature keeps the auxiliary lamp on during the discharge lamp's warm up period prior to automatically turning off the auxiliary lamp. The auxiliary lamp typically operates from a 120 $V_{AC}$ supply.

Previous auxiliary lighting circuits, however, are severely limited in their range of application. Typically, they are designed to measure specific voltage levels to determine the status of the discharge lamp. Also, the previously known auxiliary discharge lamps have no general applicability to other lamps aside from the gaseous discharge lamp to which it is connected. Furthermore, known auxiliary lighting circuits that are capable of detecting current rather than voltage may need levels of load current to be relatively high in order to detect it. In addition, the repeatability, reliability, and speed of reset timers in known auxiliary lighting circuits are a concern.

Accordingly, there is a need for an improved auxiliary lighting circuit for use with a lamp, particularly with a gaseous discharge lamp. Desirably, such an auxiliary lighting circuit can detect lower load currents than formerly was possible with known auxiliary lighting circuits, has reduced reset times during power interruptions, and has improved reset reliability and repeatability. In addition, it is desirable to have an auxiliary lighting circuit that maintains the auxiliary lamp voltage at 120 V, regardless of input voltage and can operate a timing circuit at 2 V or less.

BRIEF SUMMARY OF THE INVENTION

The auxiliary lighting circuit includes five (5) distinct sections:

a current sensing circuit which includes high current diodes which convert current flowing through a gaseous discharge lamp into a useable voltage;

a timer power supply circuit which includes a rectifier diode, a filter capacitor, a current limiting resistor and voltage limiting diodes that convert the AC voltage provided by the current sensing circuit into a useable +1.98 $V_{DC}$ regulated power supply;

an off delay timer circuit including a light emitting diode (LED) which maintains an on-state of the auxiliary lighting source for a pre-determined period of time, allowing the load, in this case a gaseous discharge lamp, to achieve full intensity before extinguishing the auxiliary light source;

a voltage control circuit which monitors the output voltage supplied to an auxiliary lamp via lead wires by turning 'on' or 'off' a triac located in the phase control circuit so as to maintain a constant AC voltage to an auxiliary lamp, regardless of the input voltages impressed upon the lead wires; and a phase control circuit including the triac referred to previously, as well as a capacitor, a diac, and a resistor divider network, which determines what portion of the AC sine wave will be directed to the auxiliary lamp and which portion of the AC sine wave will be blocked so as to maintain an average AC voltage sufficient to operate an auxiliary lamp.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
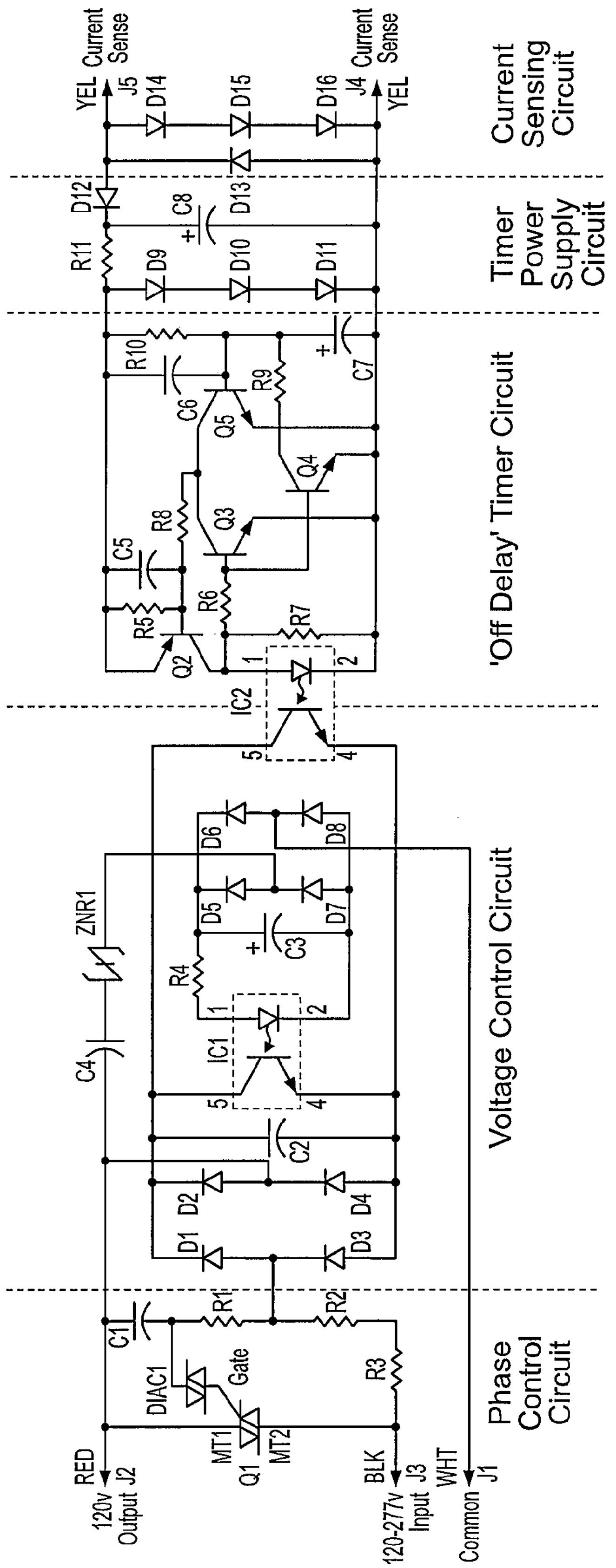
FIG. 1 is a schematic diagram of a timed circuit embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

To control the auxiliary lamp/light source, an auxiliary lighting circuit is used. The auxiliary lighting circuit of the present invention has five (5) components: a current sensing component, a timer power component, an off-delay timer component, a voltage control component, and a phase control component. Each component and their interrelation is described below.

Current Sensing Component

Figure 3:
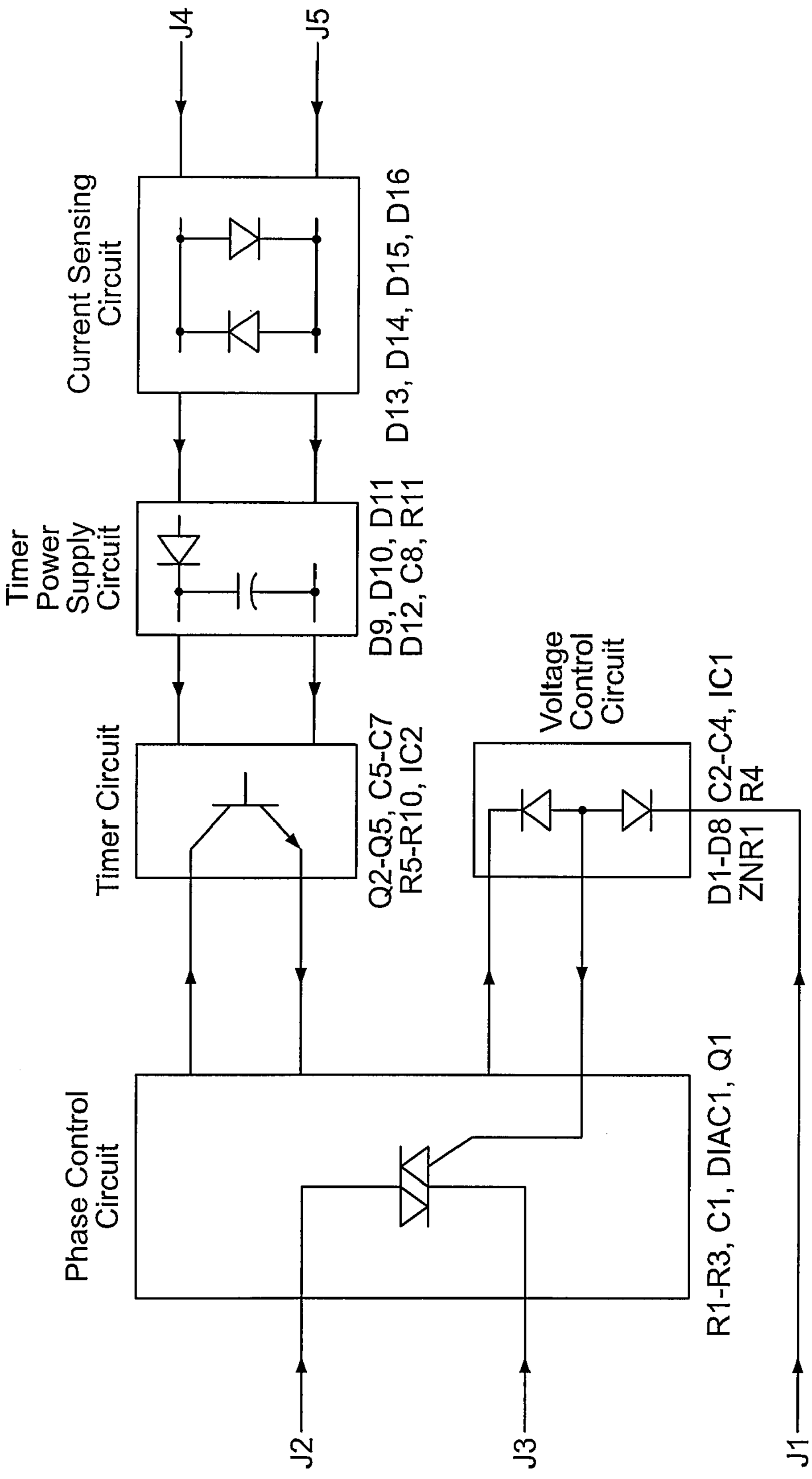
FIG. 3 is a block diagram of the timed circuit embodying the principles of the present invention.

Referring to FIGS. 1 and 3, shown on the far right side is an embodiment of the current sensing component of the auxiliary lighting circuit. The current sensing component is formed from current sensing leads, J4 and J5, four (4) diodes, three (3) of which are in series, D14, D15, and D16, and one which is in parallel, D13, and reversed biased. The current sensing leads J4, J5, detect current running through a gaseous discharge lamp and utilize a portion of this current to power the auxiliary lighting circuit. Because current available from gaseous discharge lamps is typically of sufficient power to greatly damage a circuit, the current needs to be reduced in order to protect the auxiliary circuit. Diodes D14, D15, and D16 act to limit the available power from the discharge lamp to the auxiliary circuit, dropping the power to a usable level.

When a load is connected between the current sensing leads J4 and J5, a voltage drop of approximately 2.4 V is observed between the anode of diode D14 (J5) and the cathode of diode D16 (J4). As one skilled in the art knows, each diode exhibits approximately a 0.8 volt drop during the positive portion of the AC sine wave. During the negative portion of the AC sine wave, the voltage is blocked by diodes D14 through D16, but is allowed to pass through diode D13. This diode configuration permits a small amount of energy to be extracted from the load without adversely affecting the lamp operation. Current limiting resister R11 also acts to limit the power available to the auxiliary circuit.

As the diodes in the current sensing circuit are non-inductive in nature, (such as that of a current transformer), and do not require a primary-to-secondary transfer ratio (such as that of a current transformer) the current sensing circuit can operate as effectively from a DC potential as it can from high frequency AC potentials.

The present invention is an improvement to the known current sensing circuits associated with auxiliary lighting devices because the present invention is able to detect substantially lower load currents, where such lower load currents may range between direct current (dc) and frequencies far beyond the typical 50/60 Hz.

Timer Power Supply

Referring again to FIGS. 1 and 3, the positive portion of the 2.4 volts made available from the current sensing circuit is passed into rectifier diode D12, while the negative portion of the 0.8 V is blocked by D12. This configuration forms a crude DC power supply. Filter capacitor C8 has been incorporated into the circuit to 'smooth' the DC ripple component seen at the cathode of D12.

As the energy for the power supply is derived directly from the load circuit, several amperes may be available at the cathode of D12 and positive side of filter capacitor C8. For this reason, a current limiting resistor R11 has been placed in series with the remaining portion of the circuit.

To further limit the peak voltage ($V_p$) available at current limiting resistor R11, three (3) general-purpose diodes, D9, D10 and D11 have been connected in series and placed across the power supply immediately after the current limiting resistor R11. Due to the losses of diode D12 and current limiting resistor R11, the maximum voltage made available from the timer power supply component would be less than 2.0 $V_{DC}$.

Off Delay Timer Circuit

FIGS. 1 and 3 illustrate the DC voltage provided by the timer power supply circuit that is applied to timing capacitor C7 via charging resistor R10. This forms the time base upon which the remainder of the timing circuit relies. During initial application of voltage to the timing circuit, LED in opto-coupler IC2 is off, and the timing circuit cannot influence the operation of the voltage control circuit or the phase control circuit.

As current begins to flow through the current sensing circuit by way of J4 and J5, the timer power supply circuit provides a DC voltage to resistor R10, increasing the voltage potential across capacitor C7. Due to this high sensitivity configuration, it must be noted that capacitor C6 is connected in parallel with timing resistor R10, and is provided to reduce electrical noise which may initiate false triggering of the timing circuit, due primarily by high frequency interference at current sensing leads J4 and J5. Similarly, capacitor C5 is in parallel with pull-up resistor R5, and performs the same function.

The collector of PNP transistor Q2 controls the LED of opto-coupler IC2. Transistor Q2 is typically held in a non-conductive or off-state by holding the base of Q2 at or near its emitter potential by pull-up resistor R5. As transistor Q2 is in an 'off' state, the collector of Q2 is 'open' and rests at supply minus (−) potential. Consequently, NPN transistors Q3 and Q4 are held in an off-state as a result of pull-down resistor R7, where the bases of transistors Q3 and Q4 are held at or near their emitter potential.

During the charging cycle, the voltage across timing capacitor C7 increases until the base bias threshold voltage of NPN transistor Q5 is reached. As transistor Q5 is a Darlington-type transistor, the threshold voltage will be typically 1.00 $V_{DC}$. As transistor Q5 is forward biased or turned on, the collector of transistor Q5, previously held high by resistor R5 and R8, is now pulled down to supply minus (−). As the collector of transistor Q5 is pulled down to supply minus (−), a negative voltage is also applied to the base of transistor Q2, forward biasing or turning on Q2 which in turn forces the collector of transistor Q2 up to supply plus (+). As collector of transistor Q2 is pulled up to supply plus (+), current begins to flow through LED of opto-coupler IC2 as a result of voltage potential available from the power supply circuit. With collector of transistor Q2 now at supply plus (+), so too, are the base terminals of transistors Q3 and Q4. As transistors Q3 and Q4 are forward biased or turned-on, the collectors of Q3 and Q4 are pulled down to supply minus (−). The two functions occur simultaneously.

The collector of transistor Q3, now at supply minus (−) potential, holds transistor Q2 in a conductive or on-state by forcing the base of Q2 below that of its emitter voltage, providing the LED of opto-coupler IC2 with an uninterrupted voltage source after the timing cycle has completed. Transistor Q4's collector is pulled to supply minus (−), discharging timing capacitor C7 via current limiting resistor R9. With the timing cycle completed, the LED of opto-coupler IC2 is held on by a simple latch circuit formed by PNP transistor Q2 and NPN transistor Q3. This transistor configuration also provides for virtually instant reset periods when current flow through current sensing leads J4 and J5 has been interrupted, as transistor Q2 and Q3 cannot sustain the latched state for more than a few microseconds after power is removed.

The present invention's timing circuit dramatically reduces the timer reset period required during momentary power interruptions, improves reset reliability and repeatability. The timing circuit no longer requires a negative or minus power supply voltage to initiate reset, and operates at voltages of less than two (2) volts.

Voltage Control Circuit

Figure 2:
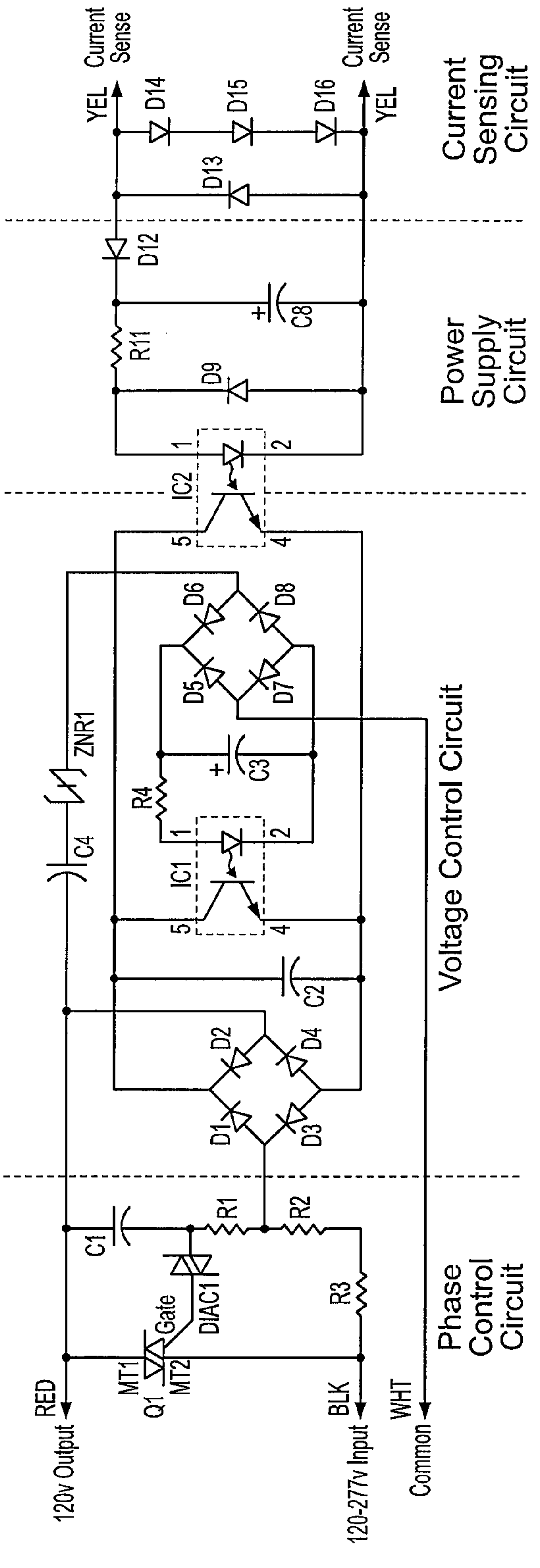
FIG. 2 is a schematic diagram of a non-timed circuit embodying the principles of the present invention.

FIGS. 1 and 2 show a voltage regulator and phase control circuit that permit operation with input voltages ranging between 120 $V_{AC}$ and 277 $V_{AC}$ while maintaining a nominal auxiliary quartz lamp voltage of 120 $V_{AC}$.

It is understood that the voltage control circuit has no appreciable influence on the phase control circuit, provided the line input voltages remain at or below 135 $V_{AC}$. As the input voltage applied between J1 and J3 exceeds 135 $V_{AC}$, however, the following sequence of events occurs.

Line input voltages in excess of 135 V are passed through triac Q1 to output terminal J2. This excessive output voltage at terminals J1 and J2 induces a potential across voltage dependent resistor ZNR1. Capacitor C4 is placed in series with ZNR1 and provides current limiting to the remainder of the control circuitry, as voltage dependent resistor ZNR1 exhibits reduced resistance as voltage potential increases.

Output voltages in excess of 135 V are passed through current limiting capacitor C4 and voltage dependent resistor ZNR1, into a full-wave bridge rectifier network comprised of rectifier diodes D5, D6, D7 and D8, with the return path being terminated at ground/common J1.

The DC voltage provided by the bridge rectifier D5-D8 is smoothed or filtered by filter capacitor C3, passed through current limiting resistor R4 to the LED of opto-coupler IC1, forward-biasing or turning on the NPN transistor located within the opto-coupler IC1. The NPN transistor within IC1 discharges energy stored within capacitor C2, causing a current to flow through bridge rectifier diodes D1, D2, D3 and D4, reducing the voltage potential between the gate and MT1 (Main Terminal 1) of triac Q1.

Reducing the voltage differential between the gate and MT1 correspondingly reduces the output voltage made available at MT1 of triac Q1. As this output voltage is reduced (as measured between terminals J1 and J2), current no longer flows through current limiting capacitor C4, voltage dependent resistor ZNR1, bridge rectifier D5-D8, current limiting resistor R4 or LED of opto-coupler IC1. As LED of IC1 is no longer illuminated, NPN transistor of IC1 forward conduction ceases, allowing triac Q1 to return to full conduction or on-state.

Repeating the previously described cycle from the on-state to the off-state occurs at a rate of 120 times per second when provided with a 60 Hz line voltage supply. Additionally, the gate of triac Q1 may be triggered at various points within the rise and fall of the sine wave, forming a simple phase control circuit.

It must be noted that the NPN transistor contained within opto-coupler IC2 is electrically connected in parallel with the NPN transistor contained within opto-coupler IC1, and where voltage control circuit exclusively controls IC1, off delay timer circuit IC2 will override the functions of the voltage control circuit by bringing the gate and MT1 of Q1 to the same electrical potential, forcing triac Q1 into a non-conductive or off state until such time as the current flow via current sensing circuit is removed, resetting the timer circuit.

Voltage Control Circuit without Timer

Figure 4:
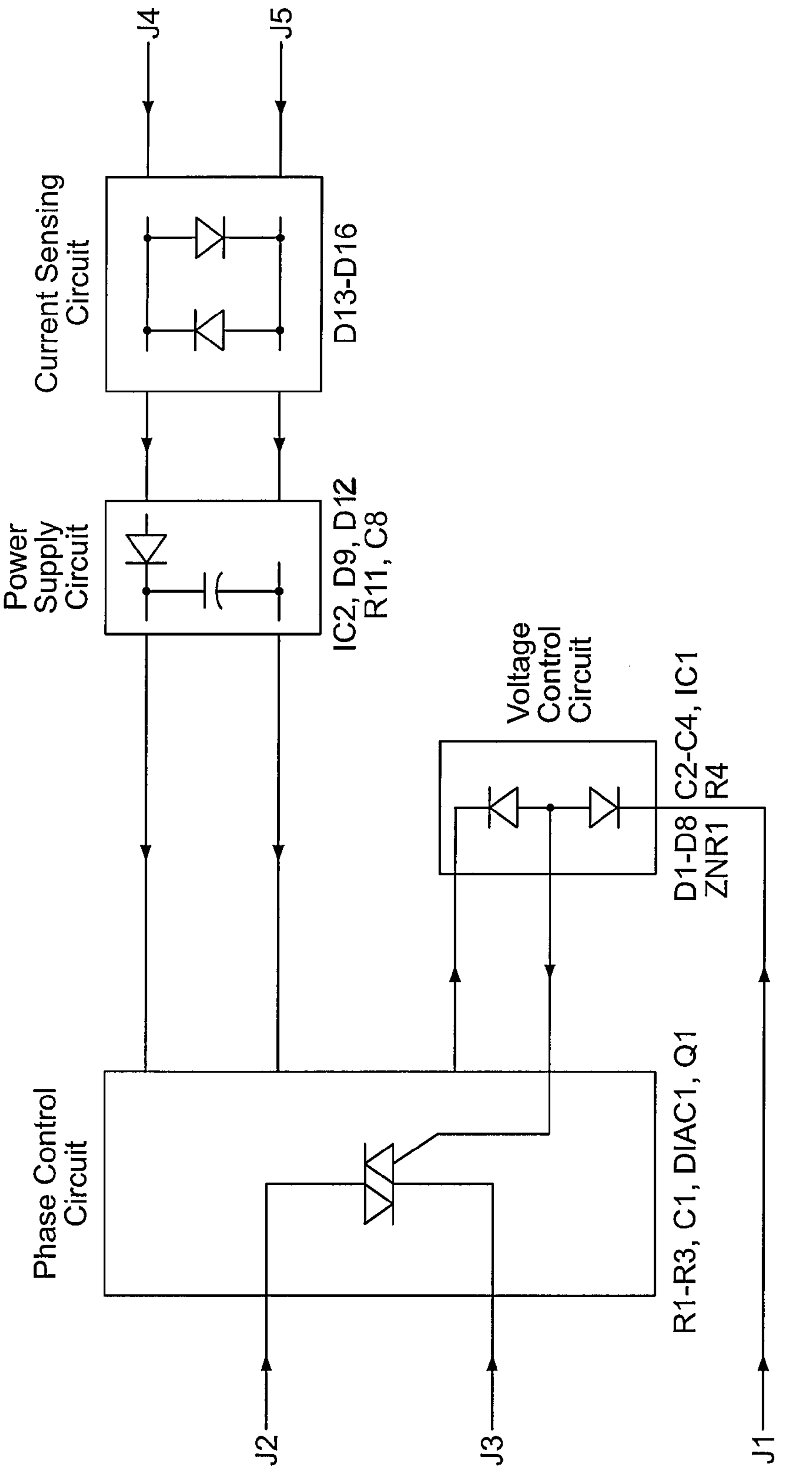
FIG. 4 is a block diagram of the non-timed circuit embodying the principles of the present invention.

FIGS. 2 and 4 illustrate the voltage control circuit without the timer circuit. As current begins to flow through current sensing leads J4 and J5, the DC voltage provided by the power supply circuit is applied to the LED of IC2, causing NPN transistor of IC2 to become conductive (turn on), which in turn 'shorts-out' the rectifier bridge comprised of diodes D1-D4, and as described, forces the voltage potential at resistors R1 and R2 to that of triac Q1 main terminal 1 (MT1), causing triac Q1 to enter a non-conducting or off-state so as to extinguish the auxiliary lamp.

Phase Control Circuit

FIGS. 1-4 illustrate a voltage regulator and phase control circuit that permit operation with input voltages ranging between 120 $V_{AC}$ and 277 $V_{AC}$ while maintaining a nominal auxiliary lamp voltage of 120 $V_{AC}$.

Referring to FIGS. 1 and 2, phase controlling triac Q1 terminals MT1 and MT2 are connected in a series configuration between 120-277 $V_{AC}$ line voltage via J3 and the auxiliary lamp via J2, which in turn is connected to the common or neutral of the line voltage at J1.

Referring now to FIG. 1, note that capacitor C1 and resistors R1, R2 and R3 form a voltage divider network connected between MT1 (main terminal 1) and MT2 (main terminal 2) of triac Q1, and at the termination of C1 and R1 is also connected to diac1 (a bi-directional 32-volt trigger or breakover device) which in turn is connected to the gate of triac Q1.

A voltage increase between terminals MT1 and MT2 of triac Q1 impresses the voltage rise upon diac1 via resistors R1, R2, and R3, momentarily forcing triac Q1 into conduction via Q1 gate, allowing line voltages to flow to the auxiliary lighting source. It should be noted that during this portion of the cycle, capacitor C1 is low enough in value and does not adversely influence the forward voltages induced by resistors R1, R2, and R3.

As the line voltage sine wave again rises above zero potential, the cycle described above is repeated at the rate of 120 times per second (60 Hz), placing triac Q1 in a fully conductive state and providing full line voltage to the auxiliary lamp. Capacitor C1 provides a slight phase angle shift to the gate of triac Q1, as the voltage provided by resistors R1, R2 and R3 increases at the rise of each half of the AC sine wave.

The circuit described above represents a normal on-state of the auxiliary lamp control, based upon line input voltages of between 100 and 135 $V_{AC}$.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A non-arcing electrical switch for use with an auxiliary light source for a gaseous discharge lamp comprising:

- means for sensing current in the gaseous discharge lamp and utilizing a portion of the sensed current to power the electrical switch;
- means for impressing a source potential across the electrical switch;
- means for controlling voltage; and means for controlling phase, wherein the means for sensing current, the means for impressing a source potential across the electrical switch, the means for controlling phase and the means for controlling voltage are operably connected to activate the auxiliary light source upon interruption of or failure by the gaseous discharge lamp.

2. The non-arcing electrical switch in accordance with claim 1, wherein the means for sensing current includes at least two diodes.

3. The non-arcing electrical switch in accordance with claim 1, wherein the means for sensing current includes at least two (2) diodes in series and one (1) diode in parallel.

4. The non-arcing electrical switch in accordance with claim 1, wherein the means for sensing current includes at least one (1) current sensing lead.

5. The non-arcing electrical switch in accordance with claim 1, wherein the means for impressing a source potential includes a capacitor, at least two (2) diodes, a resistor, and a means for transferring a signal.

6. The non-arcing electrical switch in accordance with claim 5, wherein the means for transferring a signal is an opto-isolator.

7. The non-arcing electrical switch in accordance with claim 1, wherein the means for controlling voltage includes a means for monitoring an output voltage.

8. The non-arcing electrical switch in accordance with claim 1, wherein the means for controlling voltage includes means for maintaining a constant output voltage.

9. The non-arcing electrical switch in accordance with claim 1, wherein the means for controlling voltage includes at least one (1) rectifier bridge.

10. The non-arcing electrical switch in accordance with claim 1, wherein the means for controlling voltage includes at least one (1) resistor.

11. The non-arcing electrical switch in accordance with claim 1, wherein the means for controlling voltage includes at least one (1) voltage dependent resistor.

12. The non-arcing electrical switch in accordance with claim 1, wherein the means for controlling voltage includes at least one (1) opto-isolator.

13. The non-arcing electrical switch in accordance with claim 1, wherein the means for controlling voltage includes at least one (1) capacitor.

14. The non-arcing electrical switch in accordance with claim 1, wherein the means for producing phase shifting is a capacitor.

15. A non-arcing electrical switch for use with an auxiliary light source for a gaseous discharge lamp comprising:

a current sensing component configured to sense current in the gaseous discharge lamp and utilize a portion of the current to power the electrical switch;

a power supply component;

a voltage control component; and a phase control component, wherein the current sensing component, the power supply component, the voltage control component, and the phase control component are operably connected to activate the auxiliary light source upon interruption of or failure by the gaseous discharge lamp.

16. The non-arcing electrical switch in accordance with claim 15, wherein the current sensing component includes at least two (2) diodes.

17. The non-arcing electrical switch in accordance with claim 15, wherein the current sensing component includes at least two (2) diodes in series and one (1) diode in parallel.

18. The non-arcing electrical switch in accordance with claim 15, wherein the current sensing component includes at least one (1) current sensing lead.

19. The non-arcing electrical switch in accordance with claim 15, wherein the power supply component includes a capacitor, at least two (2) diodes, a resistor, and means for transferring a signal.

20. The non-arcing electrical switch in accordance with claim 19, wherein the means for transferring a signal is an opto-isolator.

21. The non-arcing electrical switch in accordance with claim 15, wherein the voltage control component includes means for monitoring an output voltage.

22. The non-arcing electrical switch in accordance with claim 15, wherein the voltage control component includes means for maintaining a constant output voltage.

23. The non-arcing electrical switch in accordance with claim 15, wherein the voltage control component includes at least one (1) rectifier bridge.

24. The non-arcing electrical switch in accordance with claim 15, wherein the voltage control component includes at least one (1) resistor.

25. The non-arcing electrical switch in accordance with claim 15, wherein the voltage control component includes at least one (1) voltage dependent resistor.

26. The non-arcing electrical switch in accordance with claim 15, wherein the voltage control component includes at least one (1) opto-isolator.

27. The non-arcing electrical switch in accordance with claim 15, wherein the voltage control component includes at least one (1) capacitor.

28. The non-arcing electrical switch in accordance with claim 15, wherein the phase control component is a capacitor.

29. A non-arcing electrical switch for use with an auxiliary light source for a gaseous discharge lamp comprising:

a current sensing component configured to sense current in the gaseous discharge lamp and utilize a portion of the current to power the electrical switch;

a timer power supply component configured to modify the portion of the current from the gaseous discharge lamp to power the electrical switch;

an off-delay timer component;

a voltage control component; and a phase control component, wherein the current sensing component, the timer power supply component, the off-delay timer component, the voltage control component, and the phase control component are configured to activate the auxiliary light source and to deactivate the auxiliary light source.

30. The non-arcing electrical switch in accordance with claim 29, wherein the current sensing component includes at least two (2) diodes.

31. The non-arcing electrical switch in accordance with claim 29, wherein the current sensing component includes at least two (2) diodes in series and one (1) diode in parallel.

32. The non-arcing electrical switch in accordance with claim 29, wherein the current sensing component includes at least one (1) current sensing lead.

33. The non-arcing electrical switch in accordance with claim 29, wherein the timer power supply component includes a capacitor, at least two (2) diodes, a resistor, and means for transferring a signal.

34. The non-arcing electrical switch in accordance with claim 29, wherein the off-delay timer component includes an opto-isolator.

35. The non-arcing electrical switch in accordance with claim 29, wherein the voltage control component includes means for monitoring an output voltage.

36. The non-arcing electrical switch in accordance with claim 29, wherein the voltage control component includes means for maintaining a constant output voltage.

37. The non-arcing electrical switch in accordance with claim 29, wherein the voltage control component includes at least one (1) rectifier bridge.

38. The non-arcing electrical switch in accordance with claim 29, wherein the voltage control component includes at least one (1) resistor.

39. The non-arcing electrical switch in accordance with claim 29, wherein the voltage control component includes at least one (1) voltage dependent resistor.

40. The non-arcing electrical switch in accordance with claim 29, wherein the voltage control component includes at least one (1) opto-isolator.

41. The non-arcing electrical switch in accordance with claim 29, wherein the voltage control component includes at least one (1) capacitor.

42. The non-arcing electrical switch in accordance with claim 29, wherein the phase shifting component is a capacitor.

43. The non-arcing electrical switch in accordance with claim 15 wherein the voltage control component is configured to maintain a constant AC voltage to the auxiliary light source.

44. The non-arcing electrical switch in accordance with claim 15 wherein the phase control component is configured to maintain an average AC voltage sufficient to operate the auxiliary light source.

45. The non-arcing electrical switch in accordance with claim 29 wherein off-delay timer component maintains an on-state of the auxiliary light source for a pre-determined time.

46. The non-arcing electrical switch in accordance with claim 45 wherein the auxiliary light source turns off when the pre-determined time has expired.

* * * * *